United States Patent
Huang et al.

(10) Patent No.: US 10,101,776 B2
(45) Date of Patent: Oct. 16, 2018

(54) HINGE STRUCTURE

(71) Applicant: Acer Incorporated, New Taipei (TW)

(72) Inventors: Yi-Ta Huang, New Taipei (TW); Chien-Yun Hsu, New Taipei (TW); Wen-Chieh Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/644,835

(22) Filed: Jul. 10, 2017

(65) Prior Publication Data
US 2018/0113492 A1 Apr. 26, 2018

(30) Foreign Application Priority Data
Oct. 24, 2016 (TW) .............................. 105134242 A

(51) Int. Cl.
*G06F 1/16* (2006.01)
*E05D 11/00* (2006.01)
*E05D 3/02* (2006.01)
*E05D 11/08* (2006.01)

(52) U.S. Cl.
CPC ............. *G06F 1/1681* (2013.01); *E05D 3/02* (2013.01); *E05D 11/00* (2013.01); *E05D 11/087* (2013.01); *G06F 1/1616* (2013.01); *E05Y 2900/606* (2013.01)

(58) Field of Classification Search
CPC .... G06F 1/1681; G06F 1/1616; G06F 1/1618; G06F 1/162; G06F 1/1633; E05D 3/02; E05D 11/00; E05D 11/087; E05D 3/122; E05D 3/12; E05D 3/06; E05Y 2900/606; A47K 13/12; Y10T 16/540255
See application file for complete search history.

(56) References Cited

U.S. PATENT DOCUMENTS

| | | | | |
|---|---|---|---|---|
| 6,529,370 B1 * | 3/2003 | Kamishima | ........... | G06F 1/1616 200/5 A |
| 6,647,593 B2 * | 11/2003 | Iguchi | ...................... | A44C 5/12 16/278 |
| 8,978,209 B1 * | 3/2015 | Lin | ........................ | G06F 1/1618 16/303 |
| 9,856,686 B2 * | 1/2018 | Bacchetti | .................. | E05F 3/08 |
| 2006/0112516 A1 * | 6/2006 | Chen | ...................... | G06F 1/1616 16/330 |

(Continued)

FOREIGN PATENT DOCUMENTS

TW M370286 12/2009

*Primary Examiner* — Steven T Sawyer
*Assistant Examiner* — Sagar Shrestha
(74) *Attorney, Agent, or Firm* — JCIPRNET

(57) ABSTRACT

A hinge structure connected between a first body and a second body of an electronic device is provided. The first and the second bodies rotate by the hinge structure to be opened or closed relatively. The hinge structure includes a rotating shaft pivoted to the first body, a moving member sleeving on the rotating shaft and adapted to be moved axially about and rotated along with the rotating shaft, and a damping member disposed on the moving member. The moving member has a rail coupled with a guiding member of the first body. The second body rotates relative to the first body via the rotating shaft, and the guiding member moves along the rail to move the moving member along the rotating shaft axially, such that the moving member drives the damping member to be interfered with or released from the first body.

9 Claims, 4 Drawing Sheets

(56) References Cited

U.S. PATENT DOCUMENTS

| | | | | |
|---|---|---|---|---|
| 2009/0126154 A1* | 5/2009 | Lin | .................. | G06F 1/1616 16/286 |
| 2009/0133217 A1* | 5/2009 | Lin | .................. | E05F 1/1215 16/277 |
| 2010/0251518 A1* | 10/2010 | Chiang | .............. | G06F 1/1681 16/277 |
| 2010/0269298 A1* | 10/2010 | Chiang | .............. | G06F 1/1616 16/361 |
| 2010/0319163 A1* | 12/2010 | Wang | ................ | E05D 11/06 16/333 |
| 2014/0033476 A1* | 2/2014 | Bacchetti | ............ | E05F 1/1223 16/52 |
| 2015/0204128 A1* | 7/2015 | Bacchetti | ............ | E05F 1/1223 16/53 |
| 2016/0123054 A1* | 5/2016 | Senatori | .............. | E05D 3/12 361/679.27 |

* cited by examiner

HINGE STRUCTURE

CROSS-REFERENCE TO RELATED APPLICATION

This application claims the priority benefit of Taiwan application serial no. 105134242, filed on Oct. 24, 2016. The entirety of the above-mentioned patent application is hereby incorporated by reference herein and made a part of this specification.

BACKGROUND

Technical Field

The disclosure relates to a hinge structure.

Description of Related Art

In a general consumer electronic product with a lift cover such as a notebook computer, a mobile phone, etc., a main body is generally disposed at a lower half of the product, and is connected to a cover located at the upper half through a hinge structure, such that the cover can be rotatably opened and closed relative to the main body, and can be rotated to a proper angle relative to the main body to facilitate user's usage.

Taking the notebook computer as an example, in view of a configuration of the prior art, a weight of the main body is substantially greater than that of the cover, so that the user may easily open and close the cover via a single hand. However, under a current trend of thinning tendency, the weights of the main body and the cover are close to each other, so that even if the hinge structure has enough torque, the user is unable to open and close the cover via the single hand. Moreover, the hinge structure is also miniaturized along with miniaturization of the main body, so that the torque provided by the hinge structure is liable to be inadequate in operation. Therefore, the aforementioned situation is likely to cause a body shaking or other phenomenon, which leads to a poor operation feeling of the user.

SUMMARY

The disclosure is directed to a hinge structure, which is adapted to effectively suppress a body shaking phenomenon of an electronic device in operation.

The disclosure provides a hinge structure, connected between a first body and a second body of an electronic device, such that the first body and the second body are adapted to be opened and closed relative to each other through the hinge structure. The hinge structure includes a rotating shaft, a moving member and a damping member. The rotating shaft is pivoted to the first body, and the second body is fixed to the rotating shaft to pivot relative to the first body. The moving member is sleeved on the rotating shaft and is movable along an axial direction of the rotating shaft and is adapted to rotate along with the rotating shaft. A surface of the moving member has a rail coupled to a guiding member of the first body. The damping member is disposed on the moving member. The second body rotates relative to the first body through the rotating shaft, and the guiding member moves along the rail so as to move the moving member along the axial direction of the rotating shaft, and drive the damping member to be interfered with or released from the first body.

According to the above description, in the hinge structure, based on mutual coupling of the rail and the guiding member of the body, when the rotating shaft is rotated, the moving member sleeved on the rotating shaft may move along the axial direction of the rotating shaft through interaction of the rail and the guiding member, so as to drive the damping member disposed on the moving member to be interfered with or released from the body, and accordingly change a location of a supporting point of a torque produced when the bodies are opened and closed relative to each other, and shorten an arm of force used for producing the torque to suppress a body shaking phenomenon of the bodies in operation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
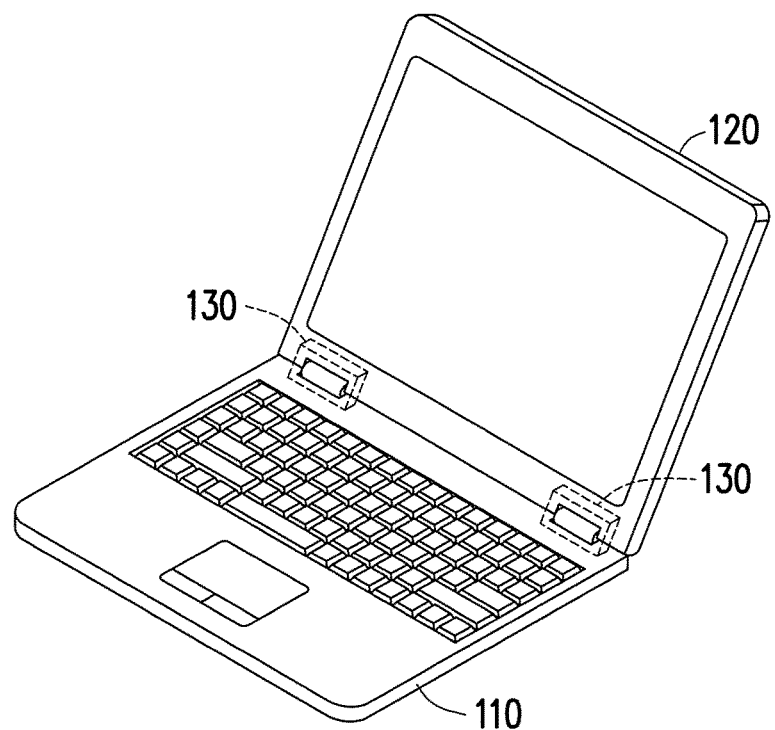
FIG. 1 is a schematic diagram of an electronic device according to an embodiment of the disclosure.

FIG. 1 is a schematic diagram of an electronic device according to an embodiment of the disclosure. Referring to FIG. 1, taking a notebook computer as an example, the electronic device 100 includes a first body 110, a hinge structure 130 and a second body 120, where the hinge structure 130 is connected between the first body 110 and the second body 120, such that the first body 110 and the second body 120 can be opened or closed relative to each other through the hinge structure 130. In the present embodiment, the second body 120 is a display module or a touch display module of the electronic device 100, and the first body 110 is a system module of the electronic device 100.

Figure 2:
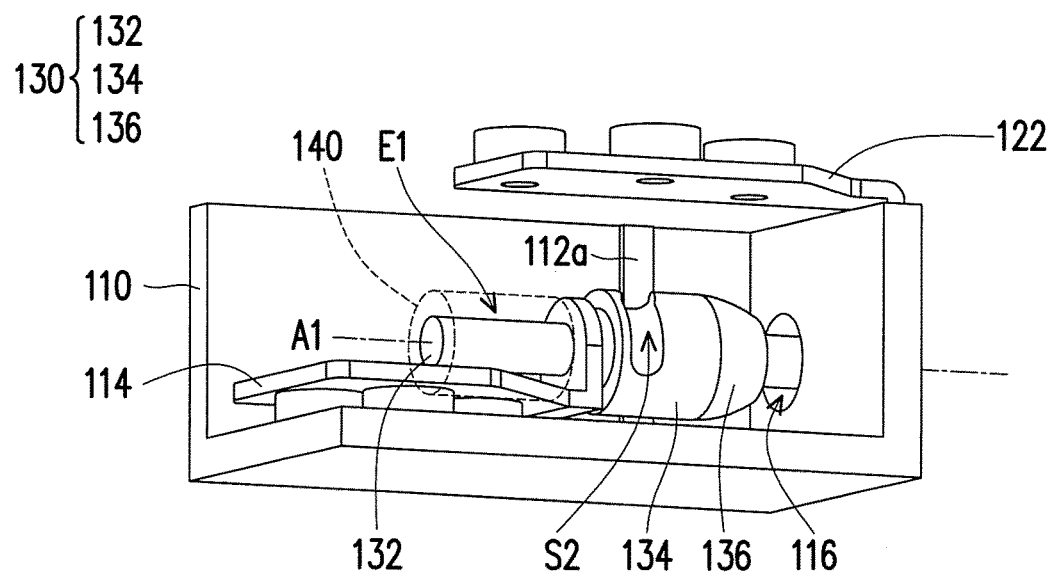
FIG. 2 is a partial schematic diagram a hinge structure of the electronic device of FIG. 1.
Figure 3:
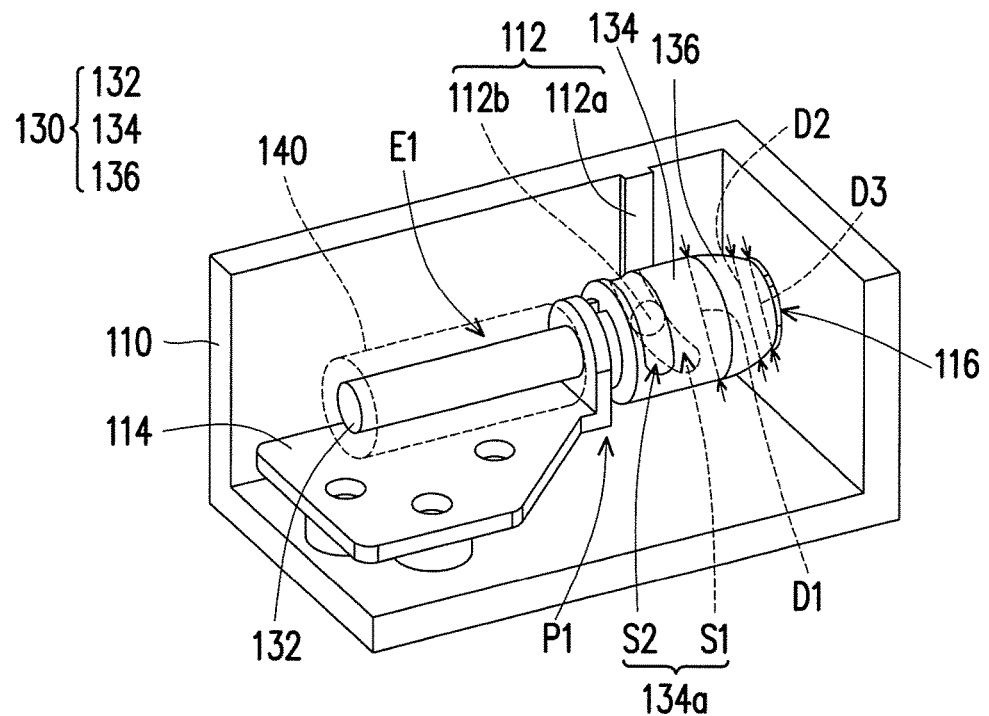
FIG. 3 is a schematic diagram of the hinge structure of FIG. 2 viewing from another viewing angle.

FIG. 2 is a partial schematic diagram a hinge structure of the electronic device of FIG. 1. FIG. 3 is a schematic diagram of the hinge structure of FIG. 2 viewing from another viewing angle. Referring to FIGS. 1 to 3, in the present embodiment, the hinge structure 130 includes a rotating shaft 132, a moving member 134 and a damping member 136, where the rotating shaft 132 is pivoted to the first body 110, and the second body 120 is fixed to the rotating shaft 132 to pivot relative to the first body 110. The moving member 134 is sleeved on the rotating shaft 132 and is movable along an axial direction A1 of the rotating shaft 132 and is adapted to rotate along with the rotating shaft 132 in the axial direction A1. The damping member 136 is disposed on the moving member 134 to synchronously rotate along with the moving member 134 relative to the rotating shaft 132.

A surface of the moving member 134 has a rail 134a, and the first body 110 has a guiding member 112, where the guiding member 112 is coupled to the rail 134a. Since the rail 134a is circumferentially disposed on the surface of the moving member 134 surrounding about the axial direction A1, when the rotating shaft 132 is rotated along the axial direction A1, the guiding member 112 may move along the rail 134a to make the moving member 134 to move along the axial direction A1 relative to the rotating shaft 132, so as to drive the damping member 136 to be interfered with or released from the first body 110.

Figure 4:
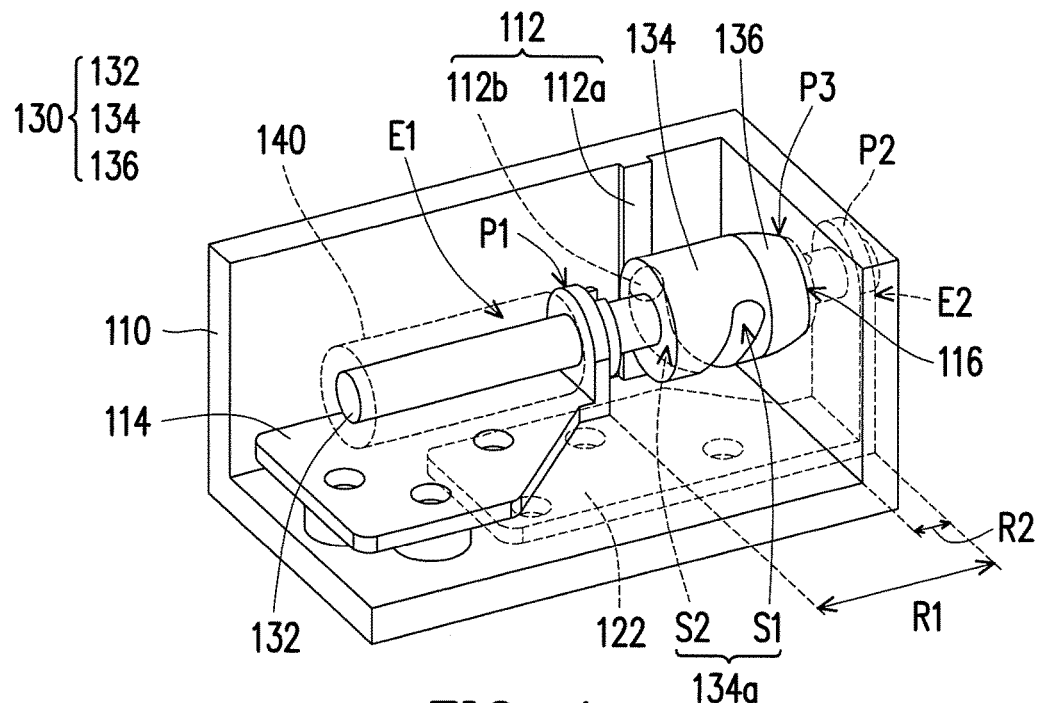
FIG. 4 is a schematic diagram of the hinge structure of FIG. 3 in another status.

FIG. 4 is a schematic diagram of the hinge structure of FIG. 3 in another status. Referring to FIG. 3 and FIG. 4, in detail, the first body 110 of the present embodiment has a first bracket 114, and a first end E1 of the rotating shaft 132 is pivoted to the first bracket 114 so that the rotating shaft 132 can be rotated relative to the first bracket 114 about the axial direction A1. The second body 120 has a second bracket 122, and the second bracket 122 is fixed to a second end E1 of the rotating shaft 132, such that the second body 120 may have a motion effect of rotating relative to the first body 110 through the rotating shaft 132. Moreover, the hinge structure 100 further includes a torque assembly 140 disposed on the rotating shaft 132 and located at the first end E1. The torque assembly 140 is, for example, an elastic element and/or a friction element (not shown) (which is known according to the existing technique, and detail thereof is not repeated). When the rotating shaft 132 is rotated relative to the first bracket 114, the torque assembly 140 is used for providing a torque between the rotating shaft 132 and the first bracket 114 for supporting the second body 120, such that the second body 120 may stay at any opening/closing angle relative to the first body 110 when the second body 120 is opened or closed relative to the first body 110.

Moreover, the damping member 136 is, for example, made of an elastic material (for example, rubber), and the first body 110 has an opening 116. The second end E2 of the rotating shaft 132 substantially penetrates through the opening 116 to connect the second bracket 122 of the second body 120, and the moving member 134 and the damping member 136 are substantially located between the opening 116 and a pivot portion P1 of the first bracket 114 and the rotating shaft 132, and along with rotation of the rotating shaft 132, the moving member 134 and the damping member 136 have a further relationship with the opening 116, which is described later.

Referring to FIG. 2 to FIG. 4, the moving member 134 is a cylinder sleeving the rotating shaft 132, and the rail 134a is located on a cylinder surface of the cylinder and is divided into a first section S1 and a second section S2, where the first section S1 presents a spiral shape relative to the cylinder, and the second section S2 presents a ring shape relative to the cylinder. In other words, when the guiding member 112 moves along the first section S1 of the rail 134a, the moving member 134 accordingly moves relative to the rotating shaft 132 along the axial direction A1, and when the guiding member 112 moves along the second section S2 of the rail 134a, the moving member 134 does not have the aforementioned axial movement (along the axial direction A1).

The guiding member 112 is, for example, a protruding structure of the first body 110 that faces the rotating shaft 132. In the present embodiment, the guiding member 112 includes a hemispherical bump 112b disposed on a convex rib 112a for corresponding to the rail 134a with a hemispherical groove, though the embodiment is not limited thereto, and in other embodiments that are not shown, the guiding member can be a convex rib or a bump, i.e., the spirit of the disclosure is met as long as the guiding member matches a contour of the rail to achieve the effect of driving the moving member.

Base on the aforementioned description, when the second body 120 of the electronic device 100 is spread relative to the first body 110 and is changed from a state shown in FIG. 3 to a state shown in FIG. 4, through the interaction of the guiding member 112 and the rail 124a, during a process that the guiding member 112 moves in the first section S1, the moving member 134 moves towards the opening 116 from the pivot portion P1 of the rotating shaft 132 and the first bracket 114, such that a part of the damping member 136 is inserted into the opening 116.

In the present embodiment, the damping member 136 is, for example, made of an elastic material such as rubber or plastic polyurethane, and is gradually contracted in appearance along a direction from the moving member 134 to the opening 116, such that an inner diameter D3 of the opening 116 is between a first diameter D1 and a second diameter D2 of two opposite sides of the damping member 136, and the damping member 136 is adapted to be inserted into the opening 116 to interfere with the first body 110.

Figure 5:
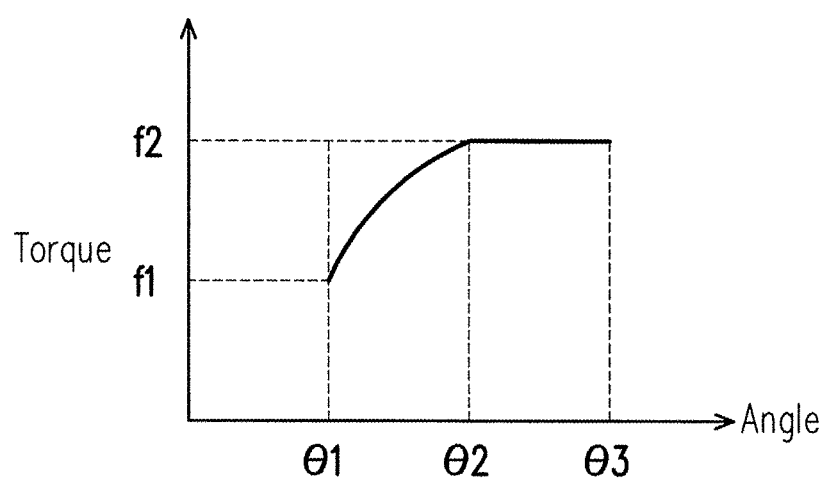
FIG. 5 is a diagram illustrating a relationship between rotating angles and produced torques of a hinge structure according to an embodiment of the disclosure.

FIG. 5 is a diagram illustrating a relationship between rotating angles and produced torques of the hinge structure according to an embodiment of the disclosure, which corresponds to a torque variation of the hinge structure changed from the state of FIG. 3 to the state of FIG. 4. Referring to FIG. 3 to FIG. 5, in the present embodiment, when the damping member 136 is not interfered with the first body 110, a first torque distance R1 is formed between a connection portion P2 of the second body 120 and the rotating shaft 132 and the pivot portion P1 of the first body 110 and the rotating shaft 132. When the damping member 136 is interfered with the first body 110, a second torque distance R2 is formed between the connection portion P2 of the second body 120 and the rotating shaft 132 and an interfere portion P3 of the damping member 136 and the first body 110 (i.e. at the opening 116), where the first torque distance R1 and the second torque distance R2 are respectively parallel to the axial direction A1 of the rotating shaft 132, and the first torque distance R1 is greater than the second torque distance R2.

In other words, when the damping member 136 is inserted into the opening 116 to start interfering with the first body 110 (corresponding to an angle θ1), a supporting point of the torque produced between the second body 120 and the first body 110 is moved from the pivot portion P1 of the first body 110 and the rotating shaft 132 to the interfere portion P3 of the damping member 136 and the first body 110, such that an arm of force of the torque produced between the second body 120 and the first body 110 is reduced from the first torque distance R1 to the second torque distance R2, i.e. the supporting point of the produced torque is moved towards the second body 120. In this way, when the second body 120 is spread to the angle θ1 relative to the first body 110, and the user operates the touch display module (i.e. the second body 120), the torque f1 is enough to support the second body 120 to avoid occurrence of the shaking phenomenon.

Moreover, the rotating shaft 132 can still be rotated after the interference between the damping member 136 and the first body 110 is occurred, as shown in FIG. 5, the torque f1 is gradually increased to a torque f2 along with an interference degree (which is determined by a variation amount of the damping member 136) between the damping member 136 and the first body 110. When the interference degree reaches the maximum value (i.e. the angle θ2 and the corresponding torque f2), the guiding member 112 is moved from the first section S1 of the rail 134a to the second section S2. Since the second section S2 is substantially located on a plane, and the plane is orthogonal to the axial direction A1, the second body 120 can still be rotated relative to the first body 110 to a maximum spreading angle θ3, and the torque thereof is still maintained to the aforementioned torque f2. It should be noted that the relationship between the rotating angle of the body (i.e. a pivot angle of the rotating shaft 132) and the corresponding torque including an axial movement distance of the moving member 134 and the interference degree between the damping member 136 and the first body 110 at the opening 116 can be properly adjusted according to a usage state of the electronic device 100.

For example, when an angle of the electronic device 100 preset for the user to perform a touch operation is 90 degrees to 135 degrees, and the maximum spreading angle of the second body 120 relative to the first body 110 is 180 degrees, it represents that the angle θ1 and the angle θ2 shown in FIG. 5 are respectively 90 degrees and 135 degrees, and the angle θ3 is 180 degrees. Namely, when the user spreads the second body 120 to 90 degrees, the damping member 136 is interfered with the first body 110 at the opening 116, and during the process that the second body 120 is spread relative to the first body 110 from 90 degrees to 135 degrees, the torque generated due to the interference is gradually increased to a predetermined value (i.e. increased from the torque f1 to the torque f2), and after the angle of 135 degrees, the hinge structure 130 may still provide the torque f2 until the second body 120 is spread to 180 degrees relative to the first body 110.

Figure 6:
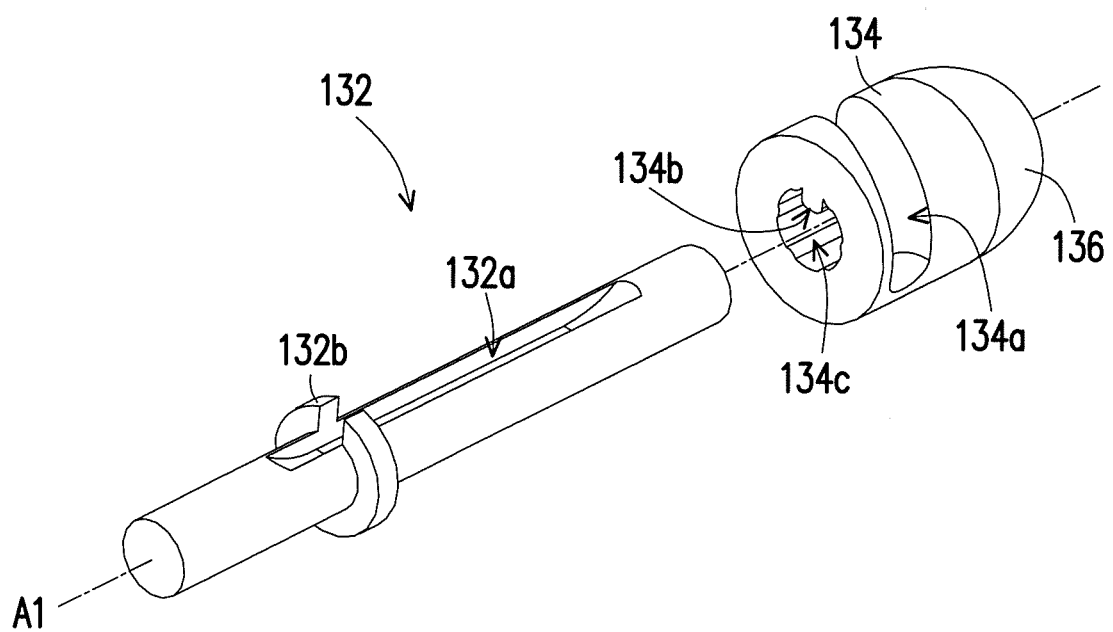
FIG. 6 is a schematic diagram of assembling a hinge structure of the present embodiment.

FIG. 6 is a schematic diagram of assembling a hinge structure of the present embodiment. Referring to FIG. 6, in the present embodiment, the rotating shaft 132 has a position-limiting groove 132a parallel to the axial direction A1, and the moving member 134 further has a position-limiting bump 134b and at least one rib-like structure 134c located on an internal wall thereof, where an extending direction of the position-limiting bump 134b and the rib-like structures 134c is consistent with the axial direction A1 of the rotating shaft 132. When the moving member 134 is sleeved on the rotating shaft 132, the position-limiting bump 134b is slidably engaged with the position-limiting groove 132a, and the rib-like structures 134c lean against other portions of the rotating shaft 132 without the position-limiting groove 132a. In this way, the moving member 134 can be smoothly driven by the rotating shaft 132 and rotates along the axial direction A1 together with the rotating shaft 132, and meanwhile slides along the axial direction A1. Moreover, the extending direction of the rib-like structures 134c is consistent with the axial direction A1, which may obvious provide a friction along an annular direction (i.e. encircle the axial direction A1) to facilitate the moving member 134 to slide along the axial direction A1, and avoid the moving member 134 to rotate relative to the rotating shaft 132. Moreover, the rotating shaft 132 further has a stop portion 132b, which substantially leans against the first bracket 114, and provides a stop function between the rotating shaft 132 and the first bracket 114 and between the moving member 134 and the rotating shaft 132 to avoid component falling off.

In summary, according to the aforementioned embodiments of the disclosure, based on mutual coupling of the rail and the guiding member of the body, the hinge structure may drive the moving member sleeving on the rotating shaft and the damping member to be interfered with or released from the first body when the rotating shaft is rotated, so as to change the location of the supporting point of the torque produced when the two bodies rotate relative to each other. Namely, after the damping member is inserted into the opening of the first body and interfered with the opening, the second body, the supporting point of the torque produced when the second body is rotated relative to the first body via the rotating shaft can be further close to the second body, so as to shorten the torque distance to facilitate the hinge structure to provide a larger torque to the second body, and accordingly avoid a shaking phenomenon of the second body when the second body is operated.

Moreover, the rail is divided into a first section and a second section, where the first section surrounds the axial direction and presents a spiral shape, and the second section surrounds the axial direction and presents a ring shape. When the guiding member moves along the first section, the moving member may have an axial displacement, and when the guiding member moves along the second section, the moving member does not produce the axial displacement, and now the second body can still be rotated relative to the first body via the rotating shaft. In this way, the interference between the buffer member and the first body has a maximum value, such that the second body can still be rotated relative to the first body under the situation that the torque provided by the hinge structure is a constant value.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A hinge structure, connected between a first body and a second body of an electronic device, such that the first body and the second body are adapted to be opened and closed relative to each other through the hinge structure, the hinge structure comprising:
 a rotating shaft, pivoted to the first body, wherein the second body is fixed to the rotating shaft to rotate relative to the first body;
 a moving member, sleeved on the rotating shaft and movable along an axial direction of the rotating shaft, and adapted to rotate along with the rotating shaft, wherein a surface of the moving member has a rail coupled to a guiding member of the first body; and
 a damping member, disposed on the moving member, wherein the second body rotates relative to the first body through the rotating shaft, such that the guiding member moves along the rail to move the moving member along the axial direction of the rotating shaft, and drive the damping member to be interfered with or released from the first body; wherein
 the moving member is a cylinder sleeving the rotating shaft, the rail is located on a cylinder surface of the cylinder and is divided into a first section and a second section, wherein the first section presents a spiral shape on the cylinder, and the second section presents a ring shape on the cylinder.

2. The hinge structure as claimed in claim 1, wherein the first body has an opening, and the moving member drives the damping member to move towards the opening, such that a part of the damping member is inserted into the opening to be interfered with the first body, or the moving member drives the damping member to be released from the opening and departed from the opening.

3. The hinge structure as claimed in claim 2, wherein the rotating shaft has a first end and a second end opposite to each other, the first end is located in the first body, and the second end penetrates through the opening and is located in the second body.

4. The hinge structure as claimed in claim 3, further comprising:
   a torque assembly, disposed on the rotating shaft and located at the first end, wherein the moving member and the damping member are located between the torque assembly and the opening, and the torque assembly provides a torque to a pivot portion of the rotating shaft and the first body.

5. The hinge structure as claimed in claim 1, wherein the guiding member is a convex rib on the first body, a bump or a combination thereof.

6. The hinge structure as claimed in claim 1, wherein when the damping member is not interfered with the first body, a first torque distance is formed between a connection portion of the second body and the rotating shaft and a pivot portion of the first body and the rotating shaft, and when the damping member is interfered with the first body, a second torque distance is formed between the connection portion of the second body and the rotating shaft and an interfere portion of the damping member and the first body, wherein the first torque distance and the second torque distance are respectively parallel to the axial direction of the rotating shaft, and the first torque distance is greater than the second torque distance.

7. The hinge structure as claimed in claim 6, wherein the second body is a display module or a touch display module of the electronic device, and the first body is a system module of the electronic device.

8. The hinge structure as claimed in claim 1, wherein the damping member is elastic.

9. The hinge structure as claimed in claim 1, wherein the rotating shaft has a position-limiting groove parallel to the axial direction, and the moving member further has a position-limiting bump and at least one rib-like structure located on an internal wall thereof, wherein an extending direction of the position-limiting bump and the at least one rib-like structure is consistent with the axial direction of the rotating shaft, when the moving member is sleeved on the rotating shaft, the position-limiting bump is slidably engaged with the position-limiting groove, and the at least one rib-like structure lean against other portions of the rotating shaft without the position-limiting groove.

* * * * *